United States Patent
Ikeda et al.

(10) Patent No.: US 12,106,277 B2
(45) Date of Patent: Oct. 1, 2024

(54) INFORMATION PROCESSING DEVICE, METHOD, AND MEDIUM

(71) Applicant: Rakuten Group, Inc., Tokyo (JP)

(72) Inventors: Tatsuya Ikeda, Tokyo (JP); Hyojung Son, Tokyo (JP); Yoshiro Matsuda, Tokyo (JP); Megumi Aizawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 355 days.

(21) Appl. No.: 17/643,605

(22) Filed: Dec. 10, 2021

(65) Prior Publication Data

US 2022/0207508 A1   Jun. 30, 2022

(30) Foreign Application Priority Data

Dec. 28, 2020   (JP) ................ 2020-218732

(51) Int. Cl.
  *G06Q 20/20* (2012.01)
  *G07G 1/00* (2006.01)
  *G07G 1/14* (2006.01)
(52) U.S. Cl.
  CPC ......... *G06Q 20/202* (2013.01); *G07G 1/0009* (2013.01); *G07G 1/14* (2013.01)
(58) Field of Classification Search
  CPC ....... G06Q 20/202; G07G 1/0009; G07G 1/14
  See application file for complete search history.

(56) References Cited

FOREIGN PATENT DOCUMENTS

| JP | 2002-169704 A | | 6/2002 |
|----|---------------|---|--------|
| JP | 2005050378 A | * | 2/2005 |
| TW | I536290 B | | 6/2016 |

* cited by examiner

*Primary Examiner* — A. Hunter Wilder
*Assistant Examiner* — Joseph M Mutschler
(74) *Attorney, Agent, or Firm* — Sughrue Mion, PLLC

(57) ABSTRACT

An information processing device includes: a settlement request reception unit that receives a settlement request; an inquiry unit that inquires of an inquiry system in charge of permission determination for settlement using a first settlement method about the settlement permission determination related to the settlement request; a result acquisition unit that acquires a result of the settlement permission determination by the inquiry system; a settlement confirmation request reception unit that is able to receive settlement confirmation requests for inquiring about a settlement result related to the settlement request a plurality of times from a settlement request issuing source while awaiting the result of the settlement permission determination by the inquiry system; and an alternative processing start unit that starts alternative processing to the first settlement method at a timing at which a final settlement confirmation request is received among the settlement confirmation requests received by a first time point determined with reference to the settlement request.

6 Claims, 8 Drawing Sheets

INFORMATION PROCESSING DEVICE, METHOD, AND MEDIUM

CROSS-REFERENCE TO RELATED APPLICATION(S)

This application claims priority to and the benefit of Japanese Patent Application No. 2020-218732, filed on Dec. 28, 2020, the disclosure of which is expressly incorporated herein by reference in its entirety for any purpose.

FIELD

The present disclosure relates to a settlement technology involving settlement permission determination.

BACKGROUND

In the related art, a proxy processing method has been proposed in which a remote maintenance center is notified of an abnormality when a proxy processing control device of a user system detects an abnormality in a sever device, and a processing request is received via the proxy processing control device and a corresponding processing program is read from a storage device and is executed by the proxy server device when a proxy processing control device of the maintenance center that has received the abnormality notification determines that proxy processing is performable from abnormality content (see Japanese Patent Application Laid-open No. 2002-169704).

SUMMARY

In the related art, a system is used that performs or denies settlement in accordance with results obtained from an inquiry system by inquiring of the inquiry system about the settlement permission determination using a predetermined settlement unit. Technologies for performing alternative processing to the settlement unit have been proposed for cases or the like in which inconveniences (failures, delays, or the like) occur in acquisition of settlement permission determination from the inquiry system. However, when a trigger to start the alternative processing is reception of a settlement confirmation request from a settlement request issuing source, the alternative processing may be unlikely started at an appropriate timing.

The present disclosure has been devised in view of the above-described problem and the present disclosure addresses the problem by enabling start of alternative processing to a settlement unit at an appropriate timing in settlement, in which the settlement unit for inquiring of an inquiry system about the settlement permission determination is used.

According to an example of the present disclosure, an image processing device includes: a settlement request reception unit configured to receive a settlement request; an inquiry unit configured to inquire of an inquiry system in charge of permission determination for settlement using a first settlement method about settlement permission determination related to the settlement request; a result acquisition unit configured to acquire a result of the settlement permission determination by the inquiry system; a settlement confirmation request reception unit configured to receive settlement confirmation requests for inquiring of a settlement result related to the settlement request a plurality of times from a settlement request issuing source while awaiting the result of the settlement permission determination by the inquiry system; and an alternative processing start unit configured to start alternative processing to the first settlement method at a timing at which a final settlement confirmation request is received among the settlement confirmation requests received until a first time point determined with reference to the settlement request.

The present disclosure can be ascertained as a method performed by an information processing device, a system, or a computer or as a program executed by a computer. The present disclosure can also be ascertained as a record in a recording medium from which the program can be read by a computer, another device, a machine, or the like. Here, a computer-readable recording medium is a recording medium in which information such as data or a program can be stored through an electrical, magnetic, optical, mechanical, or chemical operation and can be read from a computer or the like.

According to the present disclosure, it is possible to be able to start alternative processing to a settlement method at an appropriate timing in settlement in which the settlement method of inquiring of an inquiry system about settlement permission determination.

DESCRIPTION OF EMBODIMENTS

Hereinafter, an embodiment of an information processing system, an information processing device, a method, and a program according to the present disclosure will be described with reference to the drawings. Here, an embodiment to be described below is an exemplary embodiment, and the information processing system, the information processing device, the method, and the program according to the present disclosure are not limited to specific configurations to be described below. Specific configurations according to the embodiment are appropriately used and various improvements or modifications may be made.

In the present embodiment, examples of the information processing system, the information processing device, the method, and the program according to the present disclosure implemented in a system performing code settlement corresponding to a predetermined settlement method (for example, credit card settlement) will be described. Here, the information processing system, the information processing device, the method, and the program according to the present disclosure can be broadly used for a technology for providing settlement, and application targets of the present disclosure are not limited to the examples described in the embodiment.

Configuration of System

Figure 1:
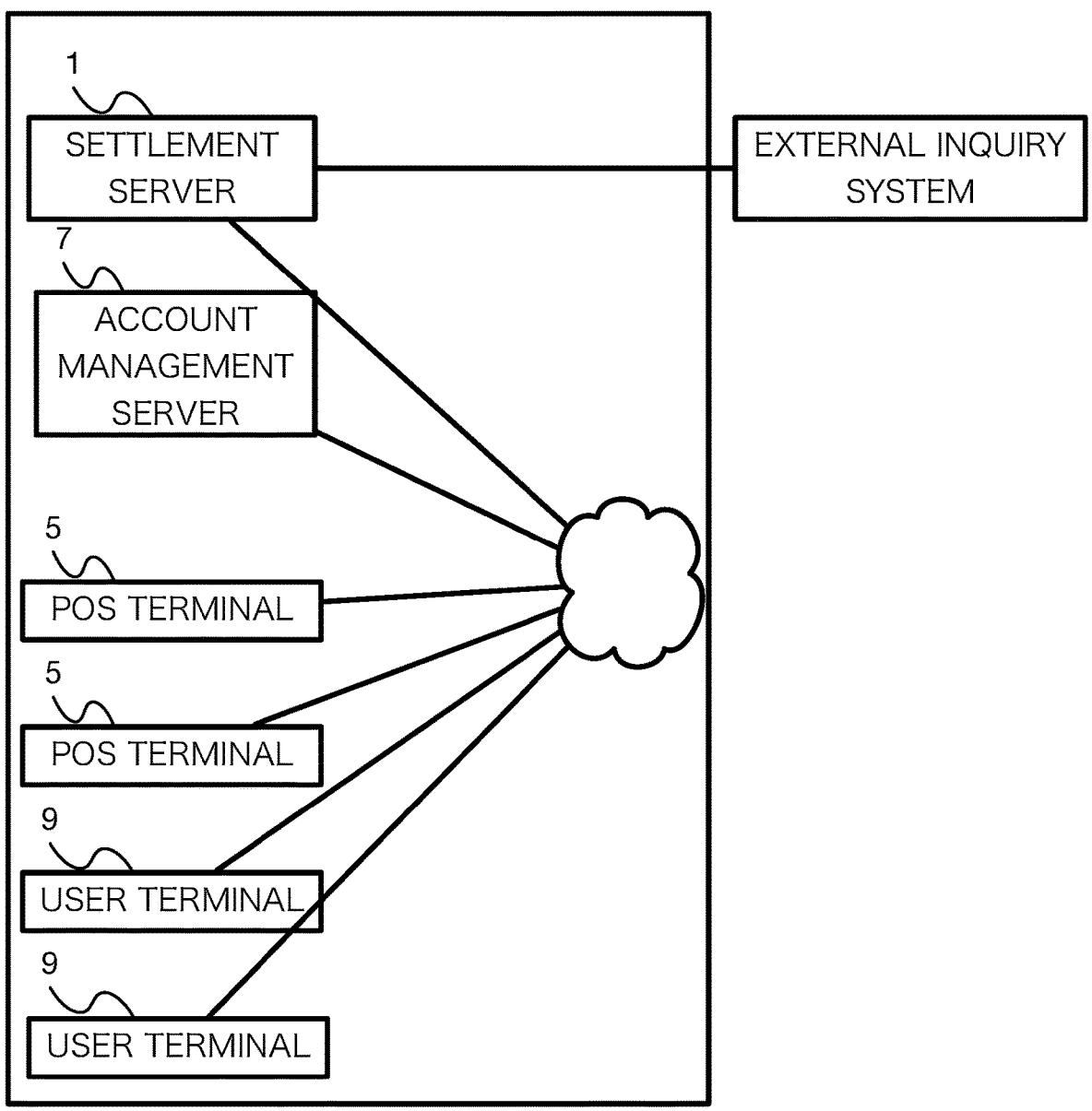
FIG. 1 is a schematic diagram illustrating a configuration of a system according to an embodiment.

FIG. 1 is a schematic diagram illustrating a configuration of a system according to the present embodiment. The system according to the present embodiment includes a code settlement providing server (hereinafter referred to as a "settlement server") 1, one or a plurality of point of sale (POS) terminals 5, an account management server 7, and one or a plurality of user terminals 9 which are connected to a network to communicate with each other, and is connected to an external inquiry system.

In general, in code settlement, a settlement server receiving a settlement request from a store terminal such as a POS terminal requests an external inquiry system (for example, a credit inquiry system of a credit card company) to determine whether to permit settlement (a credit inquiry of a user when a first settlement method associated with the code settlement is a credit card) indicted by the settlement request, and performs or denies the settlement in accordance with a result. Specifically, when a response indicating a payment permission is obtained as a result of the credit inquiry to the external inquiry system, the settlement server performs the settlement. When a response indicating a payment denial is obtained, the settlement server does not perform (denies) the settlement.

Here, in acquisition of the settlement permission determination from the external inquiry system, an inconvenience (a failure, a delay, or the like) occurs in some cases. As a case in which an inconvenience occurs in acquisition of the settlement permission determination from the external inquiry system, for example, there are various cases in which an abnormality occurs in communication between the settlement server and the external inquiry system, a processing load in the external inquiry system is excessive, and a system error occurs in the external inquiry system. A situation can arise in which a response to the request for credit inquiry is not returned although a given time has elapsed. Therefore, in the related art, a countermeasure is taken to operate the settlement normally although an inconvenience occurs in the acquisition of the settlement permission determination from the external inquiry system. For example, when an inconvenience occurs in the acquisition of the settlement permission determination from the external inquiry system, a countermeasure in which the settlement server perform the settlement permission determination instead of the external inquiry system can be adopted.

However, when determination performed by proxy on the settlement server side differs from determination performed by the external inquiry system as a result obtained by adopting this countermeasure (for example, determination by the settlement server: to perform the settlement and determination by the external inquiry system: to deny the settlement), a payment demand to a user by a company providing the settlement method (for example, a credit card company) and payoff to a service provider providing settlement server (a code settlement service provider) are not performed and the settlement server providing service provider takes over payment to a store.

Accordingly, when the determination performed by proxy by the settlement server differs from the determination performed by the external inquiry system as the result of the above-described proxy processing, a second settlement method (for example, a settlement method using points/ electronic money/bank deposit or the like of the same user) is used to allocate the settlement.

For example, when a large number of settlement requests are made or it takes time to make a reply from the external inquiry system, asynchronous processing can be adopted in processing between a POS terminal and a settlement server in order to inhibit overflow of a memory (queue) of the settlement server using a message (for example, a settlement confirmation request to confirm a processing situation) from the POS terminal. Here, a processing mode in which the settlement server guarantees a processing memory in units of settlement requests and manages processing of communication between the POS terminal and the settlement server related to the settlement request and settlement completion is referred to as synchronous processing. On the other hand, a processing mode in which the settlement server guarantees a memory for message processing and performs processing corresponding to a message whenever receiving a message (a settlement request, a settlement confirmation request, or the like) from the POS terminal, and the memory for message processing is released after a response to the message is referred to as asynchronous processing. That is, when the asynchronous processing is adopted, a countermeasure can be taken against a settlement request without considerable occupation of a memory of the settlement server to perform processing of the settlement request despite a case in which a large number of settlement requests arise, a case in which it takes a time to make a reply from the external inquiry system, or the like.

However, when the asynchronous processing is adopted and a settlement confirmation request is not received from the POS terminal, processing for alternative processing such as determination proxy or the like in the settlement server is not started and a timing at which the POS terminal transmits the settlement confirmation request depends on a specification of a store side system. Therefore, it is difficult to start alternative processing at a timing arbitrarily set by the settlement server side. As a result, it is difficult to complete settlement involving the alternative processing within a target time (a second predetermined time to be described below) or a time taken until settlement involving the alternative processing is completed depending on a specification of the store side system varies in some cases.

Accordingly, it is assumed that the system according to the present embodiment specifies a settlement confirmation request appropriate for a trigger to start the alternative processing in accordance with the specification of the store side system with reference to a timing at which the settlement confirmation request is received from the POS terminal of the store based on a store ID included in a settlement request transmitted from the POS terminal, and starts to perform the alternative processing. A technology according to the present disclosure for specifying the settlement confirmation request appropriate to the trigger to start the alternative processing has higher effectiveness in a system adopting the above-described asynchronous processing. However, a system capable of adopting the technology according to the present disclosure is not limited to the system adopting the above-described asynchronous processing. The technology according to the present disclosure can also be adopted in a system adopting the synchronous processing.

Figure 2:
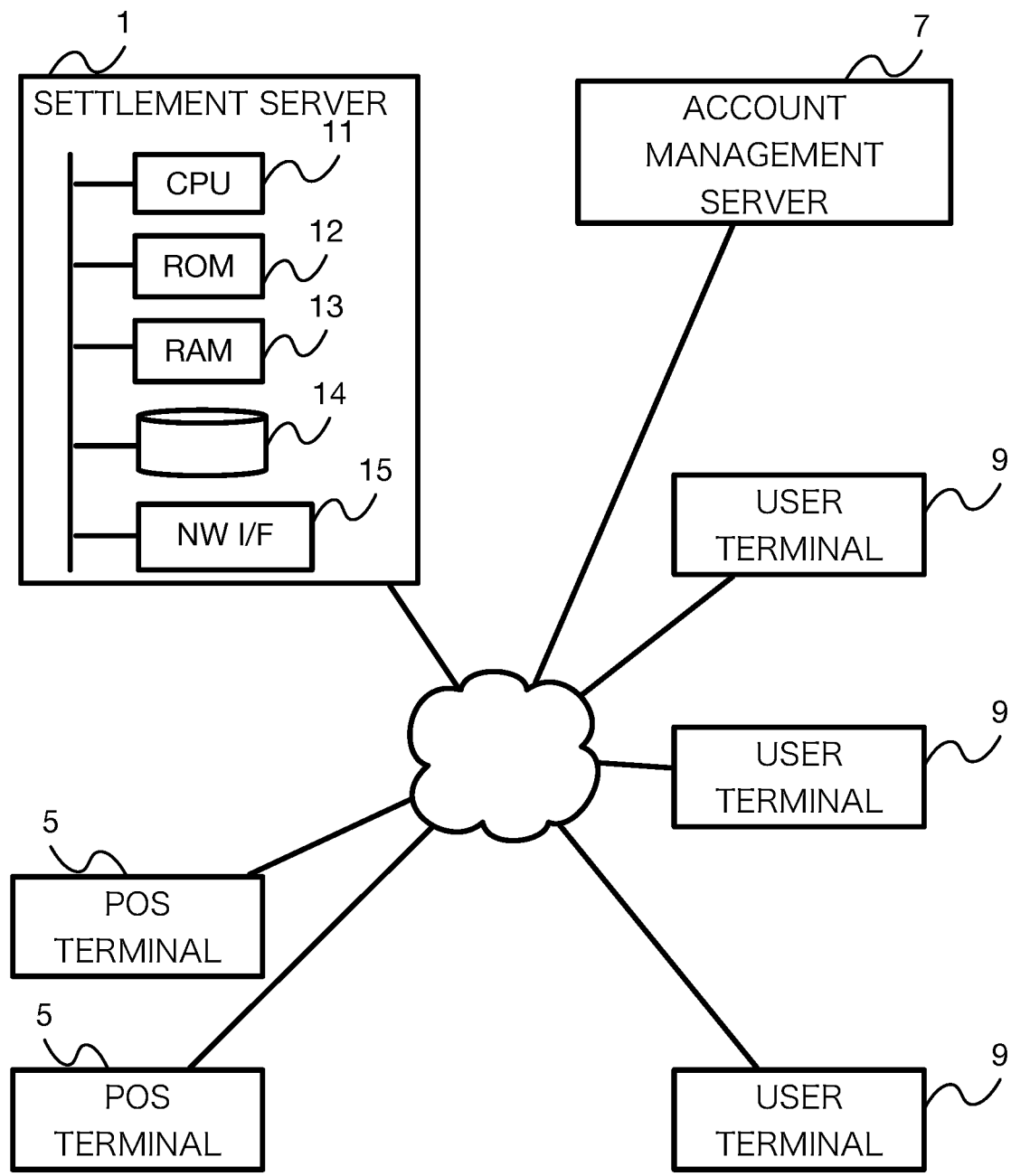
FIG. 2 is a diagram illustrating an overall hardware configuration of the system according to the embodiment.

FIG. 2 is a diagram illustrating an overall hardware configuration of the system according to the embodiment. A settlement server 1 is a server that provides a code settlement service to a user. The settlement server 1 is a computer that includes a central processing unit (CPU) 11, a read-only memory (ROM) 12, a random access memory (RAM) 13, a storage device 14 such as an electrically erasable and programmable read only memory (EEPROM) or a hard disk drive (HDD), and a communication unit 15 such as a network interface card (NIC). Here, a specific hardware configuration of the settlement server 1 can be appropriately omitted, substituted, or added in accordance with an embodiment. The settlement server 1 is not limited to a device configured in a single casing. The settlement server 1 may be implemented by a plurality of devices for which a so-called cloud or a distributed computing technology, or the like is used.

The POS terminal 5 is a terminal device that is installed in a place such as a store in which a user purchases commodities or a service and performs payment when the user purchase a commodity or a service. The POS terminal 5 is a computer that includes a CPU, a ROM, a RAM, a storage device, a communication unit, an input device, and an output device (none of which is illustrated). Here, the POS terminal 5 includes, as an input device, not only a keyboard or a touch panel but also a device such as an optical code reader, an RFID reader, or a magnetic reader that reads user identification information. Here, a specific hardware configuration of the POS terminal 5 can be appropriately omitted, substituted, or added in accordance with an aspect of an embodiment. For example, a so-called smartphone which includes a touch panel display as an input and output device and on which the user installs and executes a desired application may be used as the POS terminal 5, instead of a POS resister terminal of the related art. A kind of device which can be used as the POS terminal 5 is not limited. The POS terminal 5 is not limited to a device configured in a single casing. The POS terminal 5 may be realized by a plurality of devices for which a so-called cloud, a distributed computing technology, or the like is used.

The account management server 7 is a server that manages a user account. The account management server 7 is a computer that a CPU, a ROM, a RAM, a storage device, and a communication unit (none of which is illustrated). The account management server 7 is not limited to a device configured in a single casing. The account management server 7 may be realized by a plurality of devices for which a so-called cloud, a distributed computing technology, or the like is used. The settlement server 1 accesses the account management server 7 to acquire information regarding the user, such as a membership state, a points balance, an electronic money balance, a bank deposit balance, and the like of the user associated with a user ID. The account management server 7 issues a settlement code for code settlement associated with the user ID to the user terminal 9. Therefore, the settlement server 1 can specify the user using either the settlement code or the user ID by inquiring of the account management server 7. In the system, the settlement server 1 and the account management server 7 may be constructed as one server that has both these functions.

The user terminal 9 is a terminal device used by the user. The user terminal 9 is a computer that includes a CPU, a ROM, a RAM, a storage device, a communication unit, an input device, and an output device (none of which is illustrated). The user terminal 9 is not limited to a device configured in a single casing. The user terminal 9 may be realized by a plurality of devices for which a so-called cloud, a distributed computing technology, or the like is used. The user acquires the settlement code for the code settlement from the account management server 7 through the user terminal 9 and uses various services supplied by the settlement server 1.

Figure 3:
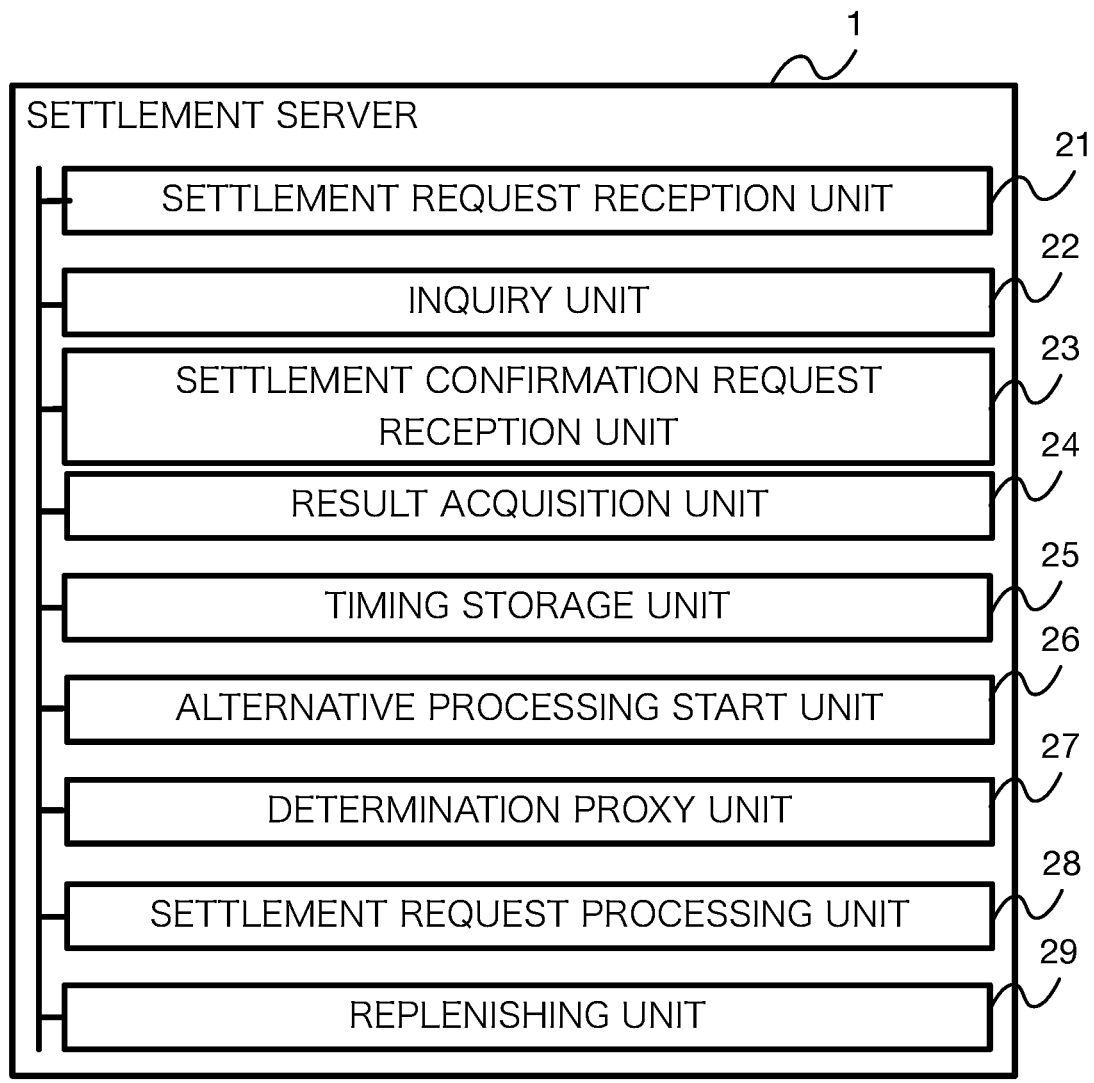
FIG. 3 is a diagram illustrating an overall functional configuration of a settlement server according to the embodiment.

FIG. 3 is a diagram illustrating an overall functional configuration of the settlement server 1 according to the embodiment. The settlement server 1 functions as an information processing device that includes a settlement request reception unit 21, an inquiry unit 22, a settlement confirmation request reception unit 23, a result acquisition unit 24, a timing storage unit 25, an alternative processing start unit 26, a determination proxy unit 27, a settlement request processing unit 28, and a replenishing unit 29, and each piece of hardware with which the settlement server 1 is equipped is controlled via a program recorded on the storage device 14 being read into the RAM 13 and being executed by the CPU 11. In the embodiment and other embodiments to be described below, each function of the settlement server 1 is performed by the CPU 11 which is a general-purpose processor and some or all of the functions may be executed by a single dedicated processor or a plurality of dedicated processor.

The settlement request reception unit 21 receives a settlement request. In the embodiment, as the settlement request for code settlement, a settlement request including a settlement code, a store ID, and a settlement amount issued by the account management server 7 is received. Here, as information for identifying a user included in the settlement request, for example, other identification information such as a user ID itself may be used.

The inquiry unit 22 inquires of the external inquiry system in charge of permission determination for settlement using a first settlement method about settlement permission determination related to the settlement request. In the embodiment, a mode in which credit card settlement is used as the first settlement method will be described. The inquiry unit 22 inquires of settlement about a credit inquiry system of a credit card company. Here, a settlement method which can be adopted as the first settlement method is not limited. For example, as the first settlement method, a settlement method in which any of points, electronic money, and a bank deposit is used may be adopted.

The settlement confirmation request reception unit 23 receives a settlement confirmation request used to inquire about a settlement result related to the settlement request from a settlement request issuing source (in the embodiment, the POS terminal 5) while awaiting a result of the permission determination by the external inquiry system. At this time, the settlement confirmation request reception unit 23 can receive the settlement confirmation requests a plurality of times with regard to one settlement.

The result acquisition unit 24 acquires the result of the permission determination by the external inquiry system.

The timing storage unit 25 stores transmission and reception timings of different settlement confirmation requests in accordance with the settlement request issuing source. In the system according to the embodiment, the transmission and reception timings of the settlement confirmation request are different in accordance with the settlement request issuing source. This is because, for each POS system introduced in a store, a transmission timing of the settlement confirmation request differs when the settlement result cannot be obtained in response to the settlement request.

Figure 4:
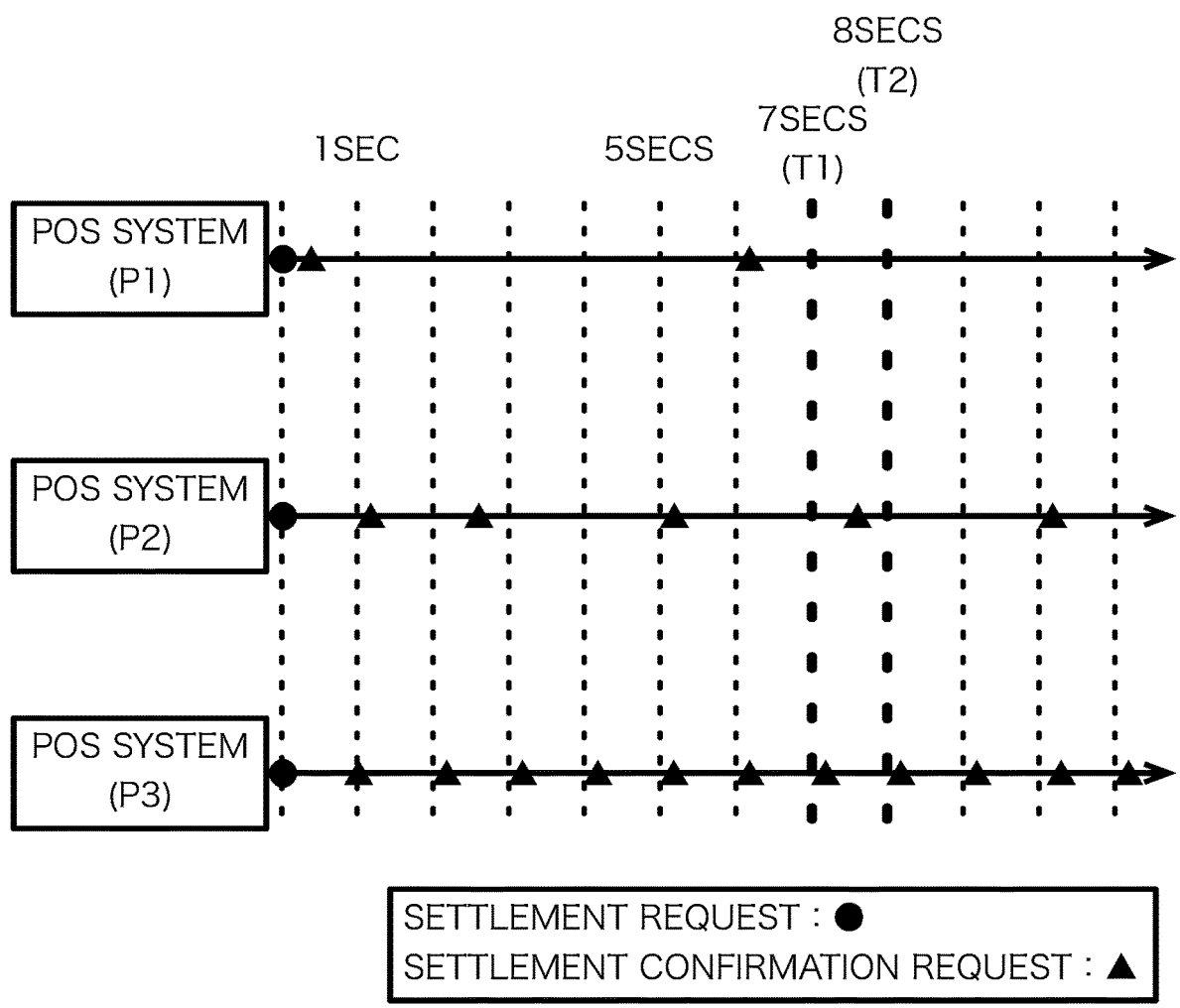
FIG. 4 is a diagram illustrating a timing at which a settlement confirmation request is transmitted for each POS system according to the embodiment.

FIG. 4 is a diagram illustrating a transmission timing of the settlement confirmation request for each POS system according to the embodiment. The timing storage unit 25 stores the transmission timing of the settlement confirmation request for each kind of POS system which is a store side partner in settlement. In the embodiment, for example, a POS system P1 transmits an initial settlement confirmation request (a Get message) immediately after a response message is received from the settlement server 1 in response to a settlement request (a Set message) and subsequently transmits a settlement confirmation request every 6 seconds. On the other hand, a POS system P2 transmits a settlement confirmation request after 1 second from reception of the response message and subsequently transmits a settlement confirmation request every 2.5 seconds after the reception of the response message. A POS system P3 transmits a first settlement confirmation request after 1 second of the settlement request, subsequently receives the response message, and transmits the settlement confirmation request every 1 second. Here, the transmission and reception timings of the settlement confirmation requests described in the embodiment are exemplary. The transmission and reception timings of the settlement confirmation requests are not limited to the examples mentioned here.

The alternative processing start unit 26 starts alternative processing to the first settlement method using reception of the settlement confirmation request as a trigger at a reception timing of the final settlement confirmation request among the settlement confirmation requests received before a first time point T1 determined with reference to the settlement request. Here, the first time point T1 is a timing which is earlier than a second time point T2 set in advance using a predetermined time point related to an inquiry to the external inquiry system as a start point by an alternative processing time or more determined based on a processing time of the alternative processing. When a time necessary for the alternative processing is n seconds, the first time point T1 is set to a time point earlier than the second time point T2 by n seconds or more, so that a determination result can be returned to the POS terminal 5 before the second time point T2.

The alternative processing start unit 26 specifies the final settlement confirmation request based on the transmission and reception timings related to the settlement request issuing source and acquired from the timing storage unit 25. The settlement request issuing source can be specified based on a store ID. As a specific example, 8 seconds from the reception of the settlement request is set as the second time point T2. When a time necessary for the alternative processing is less than 1 second, the first time point T1 is set to 7 seconds from the reception of the settlement request, so that a determination result is returned to a store until the second time point T2. Based on the example illustrated in FIG. 4, despite there is a change due to delay or the like of message transmission or reception, the following settlement confirmation request is specified as "the final settlement confirmation request among the settlement confirmation requests received until the first time point T1":

for a settlement request from the POS system P1: a settlement confirmation request transmitted after about 6 seconds after a response message is received from the settlement server 1;

for a settlement request from the POS system P2: a settlement confirmation request transmitted after about 5 seconds after a response message is received from the settlement server 1; and for a settlement request from the POS system P3: a settlement confirmation request transmitted after about 6 seconds after a response message is received from the settlement server 1.

The alternative processing start unit 26 starts processing for replenishment by the replenishing unit 29 to be described as alternative processing. In the embodiment, determination proxy processing by the determination proxy unit 27 to be described below is started as processing for replenishment by the replenishing unit 29. Here, in accordance with embodiment, the determination proxy processing by the determination proxy unit 27 may be omitted and the replenishment processing by the replenishing unit 29 may be started.

The determination proxy unit 27 performs settlement permission determination related to the settlement request based on a unique method or reference different from the external inquiry system instead of the external inquiry system in a case in which there is an inconvenience in acquisition of the permission determination from the external inquiry system. In the embodiment, the case in which there is an inconvenience in acquisition of the permission determination from the external inquiry system is a case in which an inquiry cannot be sent to the external inquiry system or a case in which an inquiry result cannot be obtained from the external inquiry system for a predetermined time or more. In this case, the determination proxy unit 27 performs the settlement permission determination related to the settlement request instead of the external inquiry system before a result of the permission determination from the external inquiry system is acquired.

For example, the determination proxy unit 27 performs the settlement permission determination related to the settlement request based on a replenishment possibility in accordance with the second settlement method to be described below as the unique method or reference different from the external inquiry system. More specifically, for example, the determination proxy unit 27 performs the settlement permission determination by determining whether at least one reference is satisfied among a plurality of references such as the following:

1) determining whether a settlement amount is equal to or less than the upper limit by comparing a settlement amount included in the settlement request with an upper limit of a settlement amount which is acquired from the account management server 7 based on the settlement code or the user ID and can be replenished by the user in accordance with the second settlement method; and 2) determining whether a store permits the replenishment in accordance with the second settlement method based on a store ID included in the settlement request.

As the upper limit of the settlement amount which can be replenished by the user in accordance with the second settlement method, an upper limit amount set in advance for the user may be referred to or a balance of a value (points, electronic money, a bank deposit, or the like) owned by the user may be referred to. When a balance of the negative value is allowed for the user, an amount obtained by adding a negative allowable frame to the balance of the value may be determined as the upper limit.

The settlement request processing unit 28 processes the settlement request based on a result of the permission determination acquired by the result acquisition unit 24 or a result of the determination by the determination proxy unit 27 (a result of the alternative processing). The settlement is performed with a record on a ledger file (not illustrated) managed by the settlement server 1. Since the settlement according to the embodiment is code settlement associated with a credit card, a value equivalent to a settlement amount in accordance with settlement content recorded on the ledger file is paid from a service provider of the settlement server 1 to a store, from a credit card company to the service provider of the settlement server 1, and from a user purchasing a commodity or the like in the store to the credit card company after the settlement is performed. The settlement request processing unit 28 ends the settlement related to the settlement request as an error when a result of the permission determination by the external inquiry system is not acquired until the second time point T2 (for example, a timing after 8 seconds after the settlement request is received) determined with reference to the settlement request has elapsed.

The replenishing unit 29 replenishes the settlement related to the settlement request using the second settlement method when there is an inconvenience in acquisition of the permission determination from the external inquiry system and a result of the settlement denial is acquired from the external inquiry system with regard to the settlement related to the settlement request for which the determination proxy unit 27 determines that the settlement is permitted. Here, the replenishing unit 29 may replenish the settlement related to the settlement request using the second settlement method without acquiring the determination result by the determination proxy unit 27 or the determination result by the external inquiry system when there is an inconvenience in the acquisition of the permission determination from the external inquiry system (for a specific example of "the case in which there is the inconvenience" refer to the description of the determination proxy unit 27). In the embodiment, the settlement server 1 or the account management server 7 retains information indicating whether an approval for performing the replenishment using the second settlement method is obtained from the user in association with the user ID for each user. The replenishing unit 29 determines whether to perform the replenishment in accordance with the second settlement method in response to the settlement request of a target by referring to the information.

Here, the second settlement method is a settlement method related to the same user as the user of the first settlement method related to the settlement request and is, for example, a settlement method in which any of points, electronic money, and a bank deposit, and the like owned by the same user as the user of the first settlement method. The replenishing unit 29 specifies the second settlement method related to the same user as the user of the first settlement method related to the settlement request by inquiring of the account management server 7 using the user ID or the like as a key and performs the settlement related to the settlement request using the specified second settlement method.

More specifically, when point payment is used as the second settlement method, the replenishing unit 29 specifies a point account of the user based on the settlement code or the user ID included in the settlement request and deducts a number of points equivalent to the settlement amount from the balance of the specified point account. When the balance of the points is less than the settlement amount, the points balance may be negative (for example, when the points balance is 300 points and the settlement amount is 500 yen, the points balance of the user is updated to negative 200 points). When electronic money payment is used as the second settlement method, the replenishing unit 29 specifies an electronic money account of the user based on the settlement code or the user ID included in the settlement request and reduces electronic money equivalent to the settlement amount from the balance of the specified electronic money account. As the electronic money, stored-value type electronic money may be used or server type electronic money may be used. When payment from a bank deposit is used as the second settlement method, the replenishing unit 29 specifies a bank account of the user based on the settlement code or the user ID included in the settlement request and performs a demand equivalent to the settlement amount on the specified bank account.

Flow of Processing

Next, a flow of processing performed by an information processing system according to the embodiment will be described. Specific content and a processing order of the processing to be described below are examples for implementing the present disclosure. The specific content and the processing order may be appropriately selected in accordance with an embodiment of the present disclosure.

Figure 5:
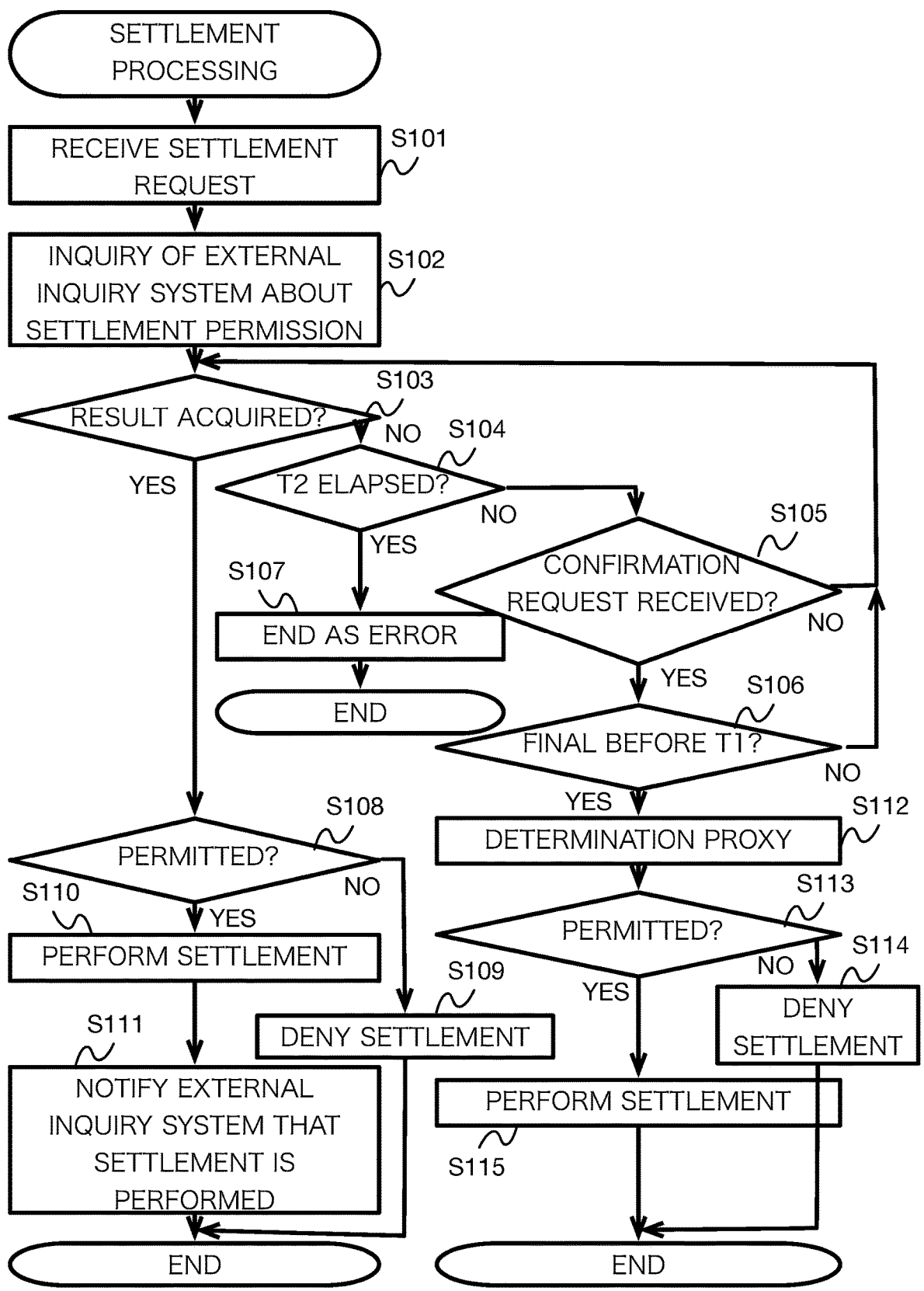
FIG. 5 is a flowchart illustrating an overview of settlement processing according to the embodiment.

FIG. 5 is a flowchart illustrating an overview of settlement processing performed by the settlement server 1 according to the embodiment. When settlement (in the embodiment code settlement) by a settlement service supplied by the settlement server 1 is requested, the user shows a settlement code acquired from the account management server 7 with the user terminal 9 and allows the POS terminal 5 in a store to read the settlement code. Then, processing in the flowchart is performed using reception of a settlement request (for example, including a store ID, a settlement amount, and a settlement code issued by the account management server 7) including information for settlement by the settlement server 1 from the POS terminal 5 in the store as trigger. In the embodiment, the example in which the settlement code acquired as information for identifying the user included in the settlement request from the account management server 7 is used has been described. However, for example, other identification information such as a user ID may be used as the information of identifying the user.

In steps S101 and S102, whether to permit the settlement is inquired of the external inquiry system in response to the received settlement request. The settlement request reception unit 21 receives the settlement request (in the embodiment, a request for code settlement supplied by the service provider of the settlement server 1) transmitted by the POS terminal 5 (step S101), the settlement server 1 transmits a response message for notifying of reception of the settlement request to the POS terminal 5. The inquiry unit 22 specifies the first settlement method (in the embodiment, the credit card settlement) corresponding to the settlement request and inquires of the external inquiry system in charge of the settlement permission determination in accordance with the specified first settlement method about a settlement permission related to the settlement request (step S102). The inquiry unit 22 acquires the user ID and the credit card information of a target user from the account management server 7 based on the settlement code included in the settlement request and inquiries about the settlement permission by transmitting information (for example, the credit card information acquired from the account management server 7 and the settlement amount included in the settlement request) necessary for the settlement permission determination to the external inquiry system. Thereafter, the processing proceeds to step S103.

In steps S103 to S106, a result of the settlement permission determination from the external inquiry system is awaited. The settlement server 1 repeatedly performs the processing of steps S103 to S106 and awaits the result of the settlement permission determination from the external inquiry system until any of the following conditions:

1) reception of the result of the settlement permission determination by the external inquiry system (YES in step S103);
2) reception of the final settlement confirmation request before the first time point T1 has elapsed (in the embodiment, a time point at which 7 seconds has elapsed after the settlement request is received) (YES in step S106); and 3) elapse of the second time point T2 (in the embodiment, a time point at which 8 seconds has elapsed after the settlement request is received (YES in step S104).

When a settlement confirmation request which is a settlement confirmation request received in a state in which the result of the settlement permission determination is not received from the external inquiry system by the settlement confirmation request reception unit 23 and is not the final settlement confirmation request before elapse of the first time point T1 (NO in step S106) is received, the settlement server 1 takes measures by transmitting a response message for notifying that the processing is being performed to the POS terminal 5. As described above, the transmission and reception timings of the final settlement confirmation request before the elapse of the first time point T1 differ in accordance with the settlement request issuing source. Therefore, the alternative processing start unit 26 determines whether the received settlement confirmation request is the final settlement confirmation request before the elapse of the first time point T1 based on the transmission and reception timings related to the settlement request issuing source and acquired from the timing storage unit 25.

When the result of the settlement permission determination by the external inquiry system is received (YES in step S103), the processing proceeds to step S108. When the final settlement confirmation request before the elapse of the first time point T1 is received (YES in step S106), the processing proceeds to step S112. Conversely, when the second time point T2 has elapsed (YES in step S104), the processing proceeds to step S107.

In step S107, the settlement request ends as an error. When the second time point T2 has elapsed (YES in step S104), the settlement server 1 ends the settlement request as an error and notifies the POS terminal 5 of a settlement request transmission source that the settlement related to the settlement request fails (settlement failure) as a response message to the settlement confirmation request from the POS terminal 5. Thereafter, the processing in the flowchart ends.

In steps S108 to S111, the settlement request is processed based on the result of the permission determination by the external inquiry system. When the result of the settlement permission determination by the external inquiry system is received (YES in step S103), the settlement request processing unit 28 confirms the content of the determination result received by the result acquisition unit 24 (step S108). When the received determination result is a settlement denial, the settlement request processing unit 28 ends the settlement related to the settlement request as an error and notifies the POS terminal 5 that the settlement request is denied (settlement failure) as a response message to the settlement confirmation request from the POS terminal 5 (step S109). Conversely, when the received determination result is the settlement permission, the settlement request processing unit 28 performs the settlement related to the settlement request in response to the settlement confirmation request from the POS terminal 5 (step S110) and notifies the POS terminal 5 of the transmission source of the settlement request of the settlement establishment as a response message to the settlement confirmation request from the POS terminal 5. The settlement server 1 notifies the external inquiry system that the settlement is performed (step S111). Thereafter, the processing in the flowchart ends.

In steps S112 to S115, the alternative processing is performed. When the final settlement confirmation request is received before the elapse of the first time point T1 (YES in step S106), the determination proxy unit 27 determines that there is an inconvenience in the acquisition of the permission determination from the external inquiry system and performs the settlement permission determination related to the settlement request instead of the external inquiry system (step S112). When the determination result by the determination proxy unit 27 is a settlement denial (NO in step S113), the settlement request processing unit 28 ends the settlement related to the settlement request as an error and notifies the POS terminal 5 that the settlement request is denied (the settlement failure) as a response message to the settlement confirmation request from the POS terminal 5 (step S114). Conversely, when the determination result by the determination proxy unit 27 is the settlement permission (YES in step S113), the settlement request processing unit 28 performs the settlement related to the settlement request (step S115) and notifies the POS terminal 5 of the settlement request transmission source that the settlement is established as a response message to the settlement confirmation request from the POS terminal 5. Thereafter, the processing in the flowchart ends.

In the embodiment, the settlement server 1 continues to await the reception of the result of the settlement permission determination by the external inquiry system even after the determination proxy by the determination proxy unit 27 (see step S112 of FIG. 5) is performed. Here, the inquiry unit 22 may temporarily cancel the inquiry performed in step S102 after the determination by the determination proxy unit 27 and may re-inquire of the external inquiry system about the settlement permission related to the settlement request in which the determination proxy by the determination proxy unit 27 is performed.

Figure 6:
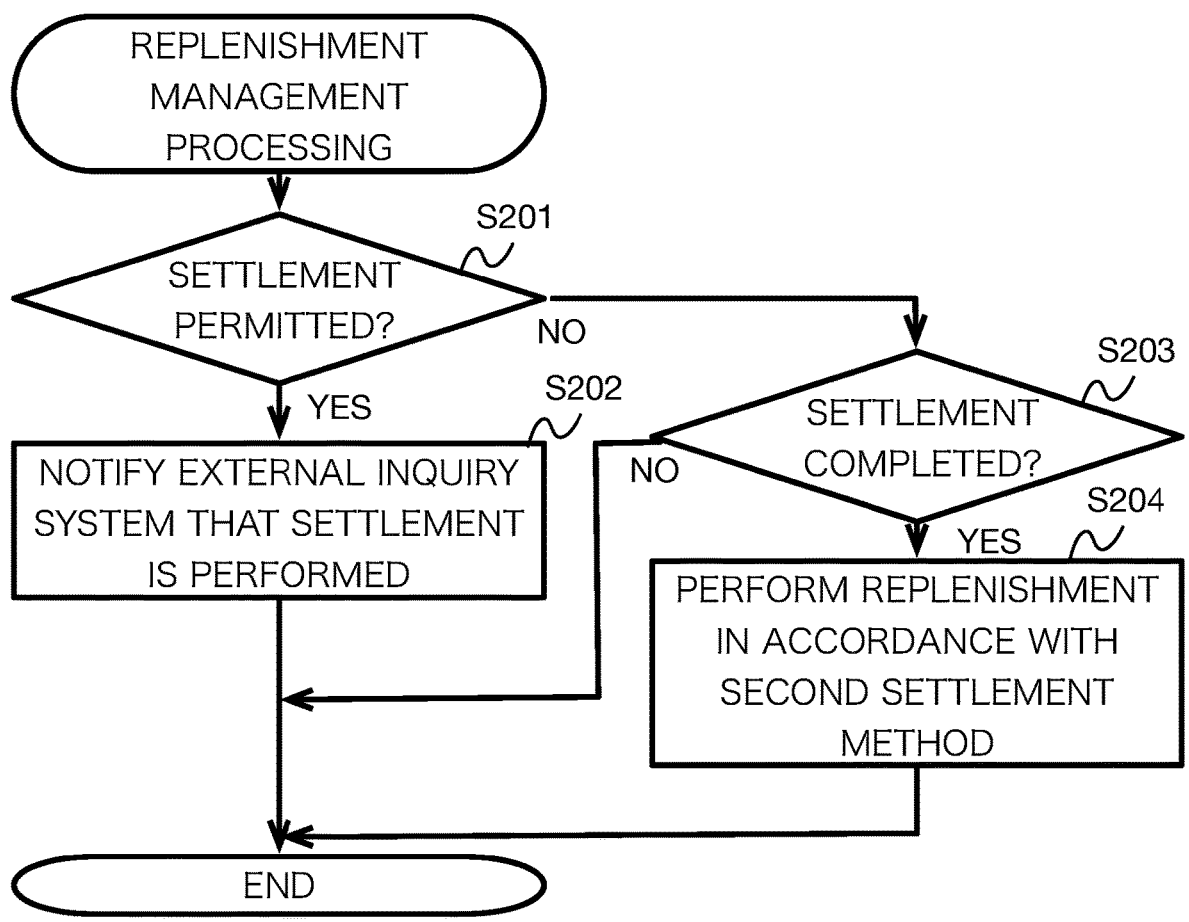
FIG. 6 is a flowchart illustrating an overview of replenishment management processing according to the embodiment.

FIG. 6 is a flowchart illustrating an overview of replenishment management processing performed by the settlement server 1 according to the embodiment. The processing in the flowchart is performed for each settlement request in which the determination proxy by the determination proxy unit 27 (see step S112 of FIG. 5) in the above-described settlement processing using reception of the result of the settlement permission determination by the external inquiry system as a trigger. Here, a timing at which the processing in the flowchart is not limited to the example described herein. When the processing corresponding to the settlement request received from the POS terminal 5 has already been completed, the timing at which the processing in the flowchart is performed may be a timing immediately after the determination proxy is performed or may be a timing after the determination proxy is performed and then a given time has elapsed.

When the result of the settlement permission determination by the external inquiry system is received, the settlement request processing unit 28 confirms content of the received determination result (step S201). When the received determination result is a settlement permission, the settlement request processing unit 28 notifies the external inquiry system of the content of the settlement performed in step S115 in the above-described settlement processing (step S202). Conversely, when the received determination result is a settlement denial, it is determined whether the settlement related to the settlement request has been complemented (see step S115 of FIG. 5) (step S203). When the settlement has been completed, the replenishing unit 29 replenishes the settlement related to the settlement request using the second settlement method (step S204). Thereafter, the processing in the flowchart ends.

In the system according to the above-described embodiment, when the settlement performed in such a manner that the settlement server 1 performs whether to permit the settlement instead of the external inquiry system and determines that the settlement is permitted is determined to be the settlement denial by the external inquiry system, a load on the service provider of the settlement server 1 can be reduced by replenishing an amount equivalent to the settlement using another settlement method (a settlement method using points, electronic money, a bank deposit, or the like) of the target user.

Further, in the system according to the embodiment, when the settlement server 1 performs whether to permit the settlement instead of the external inquiry system, the (original) determination can be performed as accurately as possible while realizing the settlement within a predetermined time (inhibiting an opportunity loss of the user) by specifying the settlement confirmation request used as a trigger to start the determination proxy based on information indicating a store related to the POS terminal 5 which is a settlement request transmission source.

Variation

In the above-described embodiment, the example in which the processing (see steps S103 to S106) for specifying the settlement confirmation request used as a trigger to start the alternative processing when the result of the settlement permission determination is awaited from the external inquiry system in the settlement processing has been described. However, the processing for specifying the settlement confirmation request used as the trigger to start the alternative processing may be omitted.

Figure 7:
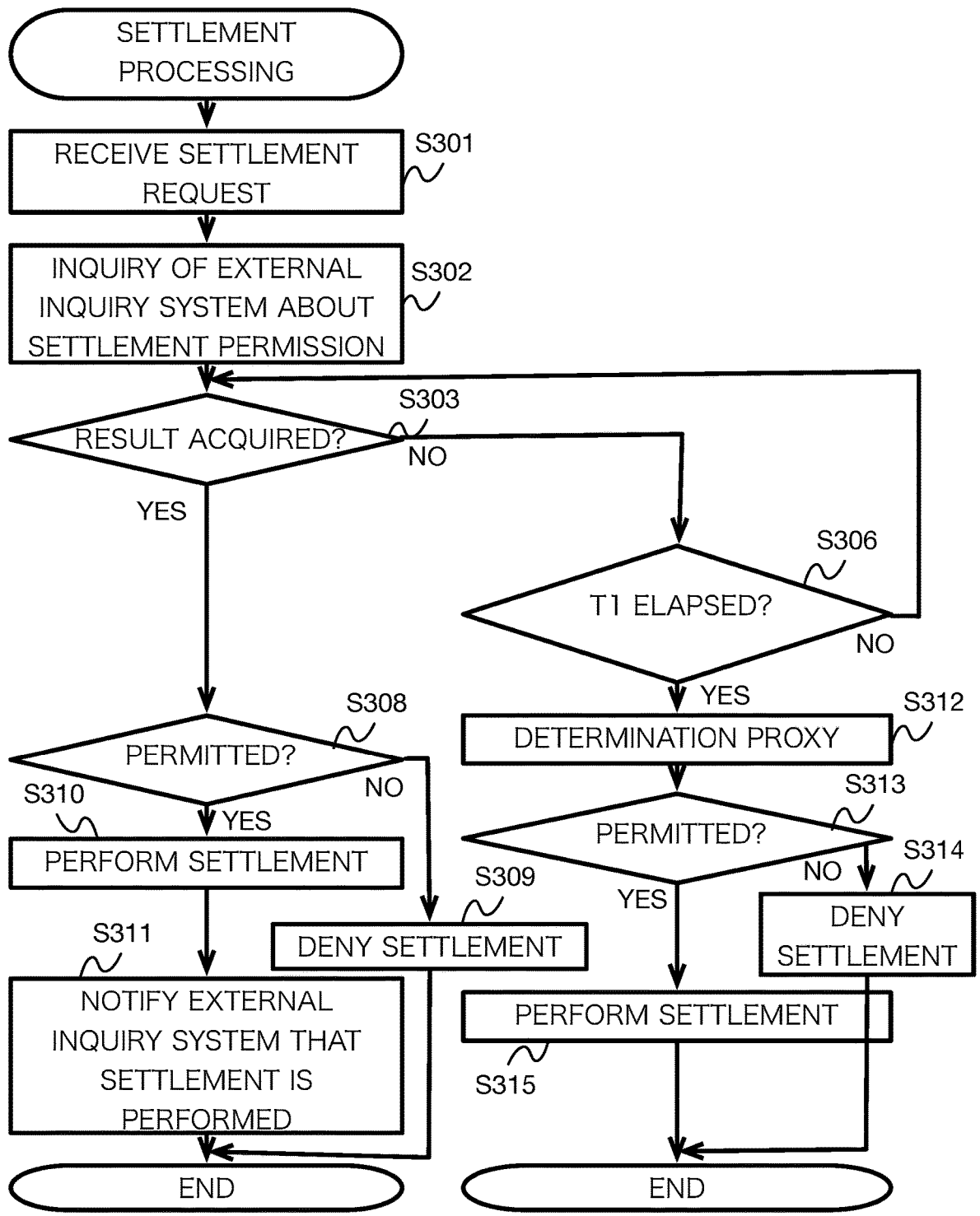
FIG. 7 is a flowchart illustrating an overview of settlement processing according to a variation.

FIG. 7 is a flowchart illustrating an overview of settlement processing performed by the settlement server 1 according to a variation. Of the processing in the flowchart, content of the processing of steps S301 and S302 is substantially the same as that of the processing of steps S101 and S102 described with reference to FIG. 5, and thus description thereof will be omitted.

In steps S303 and S306, the result of the settlement permission determination from the external inquiry system is awaited. The settlement server 1 repeatedly performs the processing of steps S303 and S306 and awaits the result of the settlement permission determination from the external inquiry system until any of the condition that the result of the settlement permission determination by the external inquiry system is received (YES in step S303) and the condition that the first time point T1 (in the embodiment, the time point at which 7 seconds has elapsed after the reception of the settlement request) has elapsed (YES in step S306) is satisfied. Meanwhile, when the settlement confirmation request reception unit 23 receives the settlement confirmation request in a state in which the result of the settlement permission determination is not received from the external inquiry system, the settlement server 1 takes measures by transmitting a response message for notifying that the processing is being performed to the POS terminal 5.

When the result of the settlement permission determination by the external inquiry system is received (YES in step S303), the processing proceeds to step S308. When the first time point T1 has elapsed (YES in step S306), the processing proceeds to step S312. Content of the processing after step S308 is substantially the same as that of the processing after step S108 described with reference to FIG. 5, and thus description thereof will be omitted.

In the above-described embodiment, the example in which the settlement permission determination is performed through the determination proxy when a reply cannot be obtained from the external inquiry system within a predetermined time has been described. However, when the reply cannot be obtained from the external inquiry system within the predetermined time, the settlement permission determination through the determination proxy may be omitted and the settlement related to the settlement request may be performed uniformly using the second settlement method.

Figure 8:
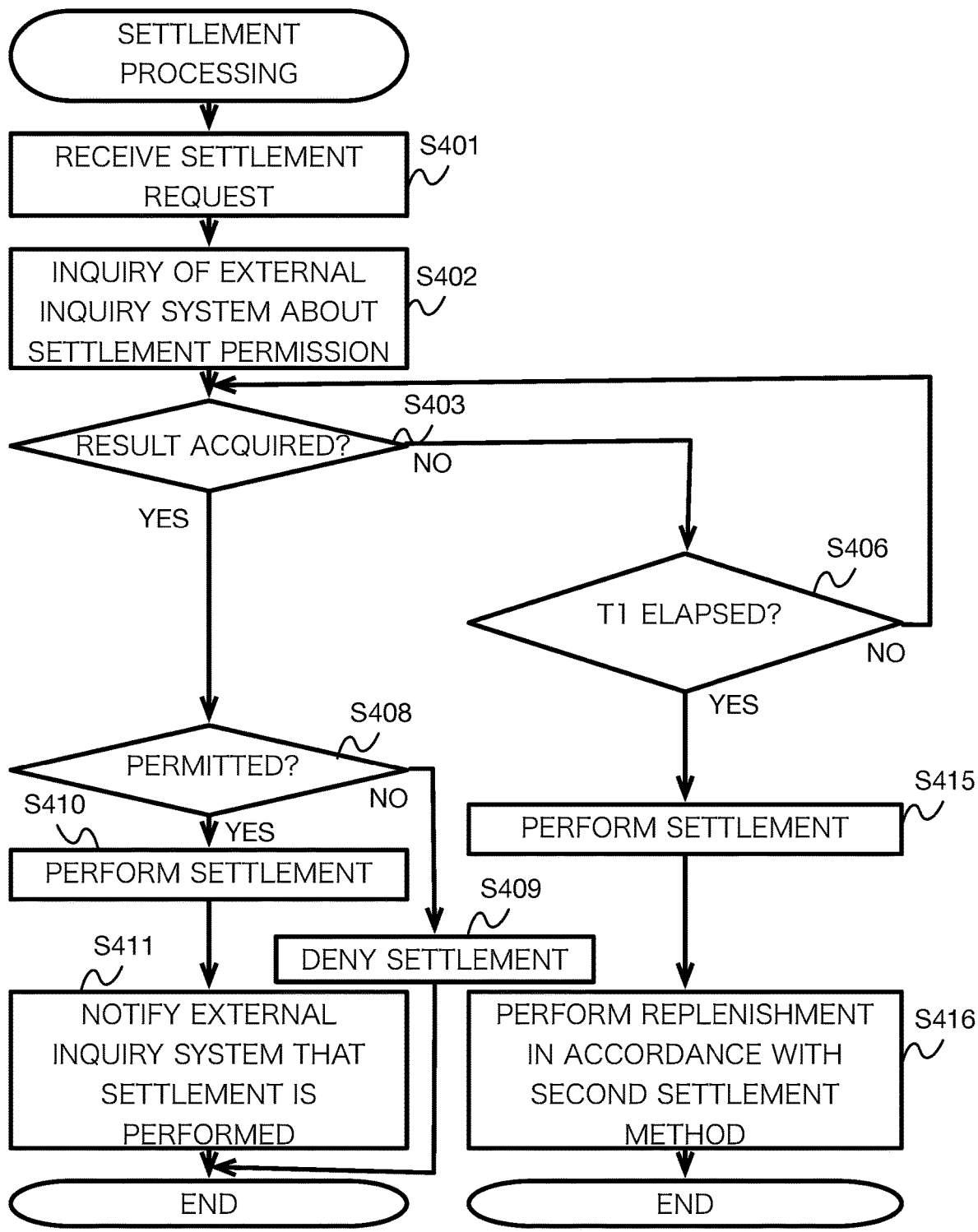
FIG. 8 is a flowchart illustrating an overview of settlement processing according to a variation.

FIG. 8 is a flowchart illustrating an overview of settlement processing performed by the settlement server 1 according to a variation. Of the processing in the flowchart, content of the processing of steps S401 and S402 is substantially the same as that of the processing of steps S101 and S102 described with reference to FIG. 5, and thus description thereof will be omitted. Content of the processing of steps S403 and S406 is substantially the same as that of the processing of steps S303 and S306 described with reference to FIG. 7, and thus description thereof will be omitted.

When the result of the settlement permission determination by the external inquiry system is received (YES in step S403), the processing proceeds to step S408. Content of the processing of steps S408 to S411 is substantially the same as that of the processing of steps S108 to S111 described with reference to FIG. 5, and thus description thereof will be omitted.

When the first time point T1 has elapsed (YES in step S406), the processing proceeds to step S415. The settlement request processing unit 28 performs the settlement related to the settlement request (step S415) and notifies the POS terminal 5 of a settlement request transmission source that the settlement is established as a response message to the settlement confirmation request from the POS terminal 5. Then, the replenishing unit 29 replenishes the settlement related to the settlement request using the second settlement method (step S416). That is, in the present embodiment, of the processing described with reference to FIG. 5, the determination proxy processing from steps S112 to S114 is omitted and the settlement related to the settlement request in which the reply cannot be obtained from the external inquiry system within the predetermined time is performed uniformly using the second settlement method. Thereafter, the processing in the flowchart ends.

In the variation described with reference to FIG. 8, the determination proxy processing is omitted. Therefore, the replenishment management processing (see FIG. 6) may be omitted.

What is claimed is:

1. An information processing device, wherein the information processing device is a settlement server configured to reduce failure events associated with network communication of a plurality of point of sale (POS) terminals, the information device comprising:
   at least one memory configured to store program code; and
   at least one processor configured to access the at least one memory and operate as instructed by the computer program code, the computer program code including:
   timing storage code configured to cause at least one of the at least one processor to store timings of a plurality of settlement confirmation requests in advance of a first settlement request in accordance with respective ones of the plurality of POS terminals,
   reception code configured to cause at least one of the at least one processor to receive the first settlement request from a first POS terminal,
   inquiry code configured to cause at least one of the at least one processor to inquire of an inquiry system in charge of permission determination for settlement using a first settlement method about settlement permission determination related to the first settlement request, result acquisition code configured to cause at least one of the at least one processor to acquire a result of the settlement permission determination by the inquiry system, settlement confirmation request reception code configured to cause at least one of the at least one processor to receive settlement confirmation requests for inquiring about a settlement result related to the settlement request a plurality of times from the first POS terminal while awaiting the result of the settlement permission determination by the inquiry system, and alternative processing code configured to cause at least one of the at least one processor to:

perform an alternative processing at a first timing at which a final settlement confirmation request is received among the settlement confirmation requests received by a first time point determined with reference to the settlement request and based on the stored timings, wherein the first timing is not later than a second time point determined by a processing requirement, by:

determining a failure has occurred in acquisition of the permission determination, determining that settlement is permitted, and notifying the first POS terminal that the settlement is permitted.

2. The information processing device according to claim 1, the processor further executes processing the settlement request, based on the result of the settlement permission determination acquired by the processor or a result of the alternative processing, wherein the processor ends settlement related to the settlement request as an error when the result of the settlement permission determination by the inquiry system is not acquired by a time at which the second time point elapses, with the second time point being determined with reference to the settlement request, and wherein the first time point is a timing which is earlier than the second time point by an alternative processing time or more determined based on a processing time of the alternative processing.

3. The information processing device according to claim 1, the processor further executes replenishing settlement related to the settlement request by using a second settlement method before the result of the settlement permission determination is acquired from the inquiry system, wherein the processor starts processing for the replenishment by the processor as the alternative processing.

4. The information processing device according to claim 3, the processor further executes performing the settlement permission determination related to the settlement request in place of the inquiry system before the result of the settlement permission determination is acquired from the inquiry system, wherein the processor replenishes the settlement related to the settlement request by using the second settlement method when a result of settlement denial is acquired from the inquiry system with regard to the settlement related to the settlement request for which the processor determines that the settlement is permitted.

5. A method of a settlement server configured to reduce failure events associated with network communication of a plurality of point of sale (POS) terminals, the method comprising:

storing timings of a plurality of settlement confirmation requests in advance of a first settlement request in accordance with respective ones of the plurality of POS terminals;

receiving the first settlement request from a first POS terminal;

inquiring of an inquiry system in charge of permission determination for settlement using a first settlement method about settlement permission determination related to the first settlement request;

acquiring a result of the settlement permission determination by the inquiry system;

receiving one or more settlement confirmation requests for inquiring about a settlement result related to the settlement request a plurality of times from the first POS terminal while awaiting the result of the settlement permission determination by the inquiry system;

performing an alternative processing at a first timing at which a final settlement confirmation request is received among the settlement confirmation requests received by a first time point determined with reference to the settlement request and based on the stored timings, wherein the first timing is not later than a second time point determined by a processing requirement, wherein the performing the alternative processing comprises:

determining a failure has occurred in acquisition of the permission determination, determining that settlement is permitted, and notifying the first POS terminal that the settlement is permitted.

6. A non-transitory computer-readable recording medium having recorded thereon program code for execution by at least one processor of a settlement server configured to reduce failure events associated with network communication of a plurality of point of sale (POS) terminals, the program code including:

timing storage code configured to cause at least one of the at least one processor to store timings of a plurality of settlement confirmation requests in advance of a first settlement request in accordance with respective ones of the plurality of POS terminals;

reception code configured to cause at least one of the at least one processor to receive the first settlement request from a first POS terminal;

inquiry code configured to cause at least one of the at least one processor to inquire of an inquiry system in charge of permission determination for settlement using a first settlement method about settlement permission determination related to the first settlement request;

result acquisition code configured to cause at least one of the at least one processor to acquire a result of the settlement permission determination by the inquiry system;

settlement confirmation request reception code configured to cause at least one of the at least one processor to receive settlement confirmation requests for inquiring about a settlement result related to the settlement request a plurality of times from the first POS terminal while awaiting the result of the settlement permission determination by the inquiry system; and alternative processing code configured to cause at least one of the at least one processor to:
perform an alternative processing at a first timing at which a final settlement confirmation request is received among the settlement confirmation requests received by a first time point determined with reference to the settlement request and based on the stored timings, wherein the first timing is not later than a second time point determined by a processing requirement, by:
 determining a failure has occurred in acquisition of the permission determination,
 determining that settlement is permitted, and
 notifying the first POS terminal that the settlement is permitted.

* * * * *